United States Patent [19]

Bowen et al.

[11] Patent Number: 5,243,681
[45] Date of Patent: Sep. 7, 1993

[54] APERTURE DISK ATTENUATOR FOR LASER DIODE CONNECTOR

[75] Inventors: Terry P. Bowen, Etters; Gregory A. Livingston, Highspire; Randall B. Paul, Elizabethville, all of Pa.; Robert W. Roff, Westfield, N.J.

[73] Assignee: AMP Incorporated, Harrisburg, Pa.

[21] Appl. No.: 867,582

[22] Filed: Apr. 13, 1992

[51] Int. Cl.⁵ .............................................. G02B 6/32
[52] U.S. Cl. ..................................... 385/140; 359/885
[58] Field of Search ............................... 385/88, 140; 250/227.11; 357/11; 359/885, 227

[56] References Cited

U.S. PATENT DOCUMENTS

| H491 | 7/1988 | Pitruzzello et al. | 385/140 |
| 4,979,791 | 12/1990 | Bowen et al. | 385/140 |
| 5,082,345 | 1/1992 | Cammons et al. | 385/140 X |
| 5,109,468 | 4/1992 | Tamulevich et al. | 385/140 |

Primary Examiner—Akm E. Ullah
Attorney, Agent, or Firm—Katherine A. Nelson; Driscoll A. Nina, Jr.

[57] ABSTRACT

A connector assembly (10) for connecting a laser diode (14) and an optical fiber (12). The assembly (10) includes an optical connector subassembly (26) having an input for collecting optical energy emitted by the laser diode (14) and an output for transmitting a beam of the collected optical energy to the optical fiber (12), and attenuation means (24) between the input and the output for reducing the power of the beam of collected optical energy at the output to be transmitted to the optical fiber (12). A connector assembly of the present invention is effective in transmitting energy from a light source to an optical fiber with the same accuracy of alignment as a coupling of an optical fiber to an optical fiber; and, at the same time, is effective in controlling the power of the transmitted energy to protect against accidental injury due to inadvertent viewing of the light source when the optical fiber is disconnected from the assembly and to control the power of the optical energy entering the optical fiber.

10 Claims, 4 Drawing Sheets

APERTURE DISK ATTENUATOR FOR LASER DIODE CONNECTOR

FIELD OF THE INVENTION

This invention relates generally to a connector assembly for connecting a laser diode and an optical fiber; and, more particularly, to a connector assembly having an optical attenuator for limiting the power of the light emitted from a laser diode and presented to an optical fiber.

BACKGROUND OF THE INVENTION

Assemblies for connecting a diode to an optical fiber are known. In such conventional assemblies, optical emission from the diode is normally transmitted successively through different transparent materials having different indices of optical refraction.

A difficulty often encountered with such connector assemblies is that the optical emission is scattered at the boundaries between transparent materials of different indices. Another difficulty is that the optical emission can reflect from surfaces of the materials or from a junction of one of the materials with an air gap. In the event the diode is a laser diode, and the emission is reflected backward at low angles of incidence to the reflecting surface, such backward reflections can enter the laser diode and cause instability of the diode.

A connector assembly designed to overcome the aforementioned disadvantages is disclosed by U.S. Pat. No. 4,979,791, which is assigned to the assignee of the present application. The connector assembly of U.S. Pat. No. 4,979,791 eliminates backward reflections and the pigtail coupling commonly employed where bare optical fibers are coupled to a laser package. The connector assembly of U.S. Pat. No. 4,979,791 provides a disconnectable coupling for an optical fiber to a laser diode which includes a connector body encircling an optical focusing element, the laser diode having an emission axis aimed along the axis of the focusing element, and a coupling element contacting the focusing element without an air gap therebetween. The focusing element is adapted to convert diverging optical emission of the laser diode into a converging beam, and the coupling element is intended to receive the converging beam without backward reflection and to transmit the converging beam to the optical fiber.

A common concern of known disconnectable connector assemblies for connecting laser diodes to optical fibers is the potentially hazardous situation presented when the optical fiber is disconnected from the assembly while the laser diode is operative (that is, the diode is emitting radiation at the time of disconnection) inasmuch as an operator inadvertently coming into visual contact with the laser emission may suffer eye injury, possibly even loss of vision. A need, therefore, exists for a connector assembly that reduces the laser emission to a safe and non-injurious level while still effectively and operatively coupling the laser diode to the optical fiber.

In addition, there are many applications where it is desirable to have the capability of reducing or controlling the power of the light entering into the optical fiber.

SUMMARY OF THE INVENTION

The present invention provides a connector assembly for connecting an optical fiber to a laser diode or other light source which includes attenuation means for limiting the power of the radiation emitted from the light source and passing through the assembly so as to be at an eyesafe or other desired level.

A connector assembly according to the invention includes optical connecting means having an input for collecting optical radiation emitted by the energy source and an output for transmitting a beam of the collected optical emission to the optical fiber, and attenuation means between the input and the output for reducing the power of the beam at the output to be transmitted to the optical fiber A connector assembly of the present invention is effective in transmitting optical energy from a light source to an optical fiber with the same accuracy of alignment as a coupling for a optical fiber to an optical fiber; and, at the same time, is effective in controlling the power of the optical beam transmitted therethrough and in protecting against accidental injury due to inadvertent viewing of the light source when the optical fiber is disconnected from the assembly.

In accordance with a presently preferred embodiment, the attenuation means comprises a disk-shaped member having a small opening or aperture positioned substantially centrally therein. The disk-shaped member functions to block aberrated higher order modes of the beam of collected optical energy while allowing lower order modes to pass therethrough, thereby reducing the power of the beam at the output of the connecting means. The extent to which the beam is attenuated is a function of the size of the aperture; and the smaller the aperture, the more diffracted the passing beam will be, and the greater extent the power of the beam at the output of the connecting means and entering the optical fiber will be reduced.

In accordance with a most presently preferred embodiment, the optical connecting means includes first and second optical connecting elements and the attenuation disk is positioned between the two elements. The first and second optical connecting elements comprise a first focusing lens for collecting radiation from the light source at the input and for producing a converging beam of radiation, and an optical coupler for transmitting the converging beam to the output at a beam diameter that is matched to the beam acceptance conditions of the optical fiber. The connecting elements and the attenuation disk are preferably supported in a tubular-shaped housing to define a connector subassembly of the overall connector assembly.

Further advantages and specific features of the invention will be set out hereinafter in conjunction with the following detailed description of a presently preferred embodiment.

DETAILED DESCRIPTION OF THE PREFERRED EMBODIMENT

A connector assembly according to a presently preferred embodiment of this invention comprises a connector assembly 10 for disconnectably coupling an optical fiber 12 to a hermetically packaged laser diode 14 with the same accuracy of alignment as in the coupling of an optical fiber to an optical fiber, while reducing backward reflection of the emission from the diode and attenuating the radiation beam transmitted to the optical fiber 12 to a Class I ("eyesafe") level as known in the industry.

Figure 1:
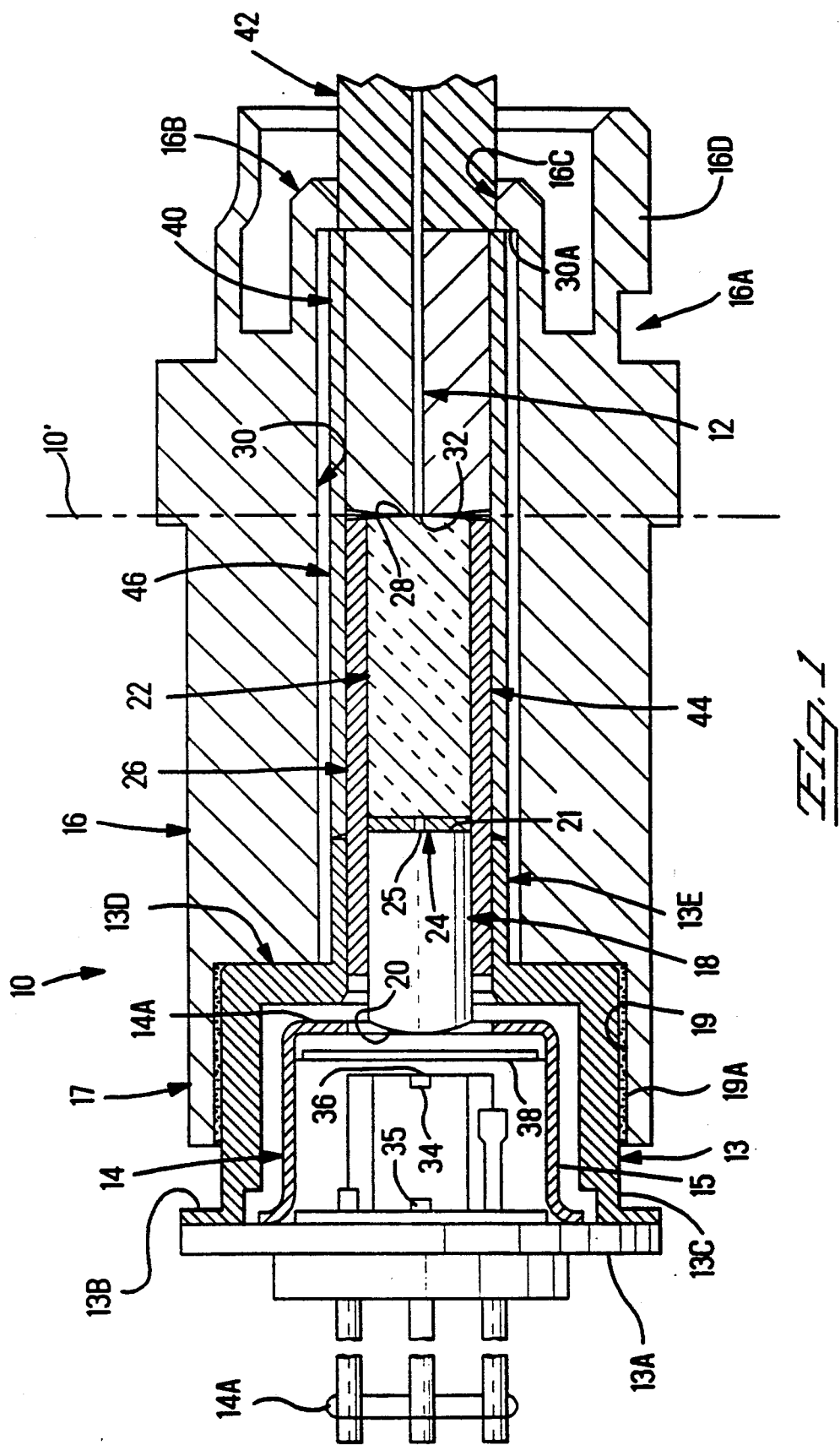
FIG. 1 is a cross-sectional view of a connector assembly for connecting a laser diode to an optical fiber according to a presently preferred embodiment of the invention.
Figure 2:
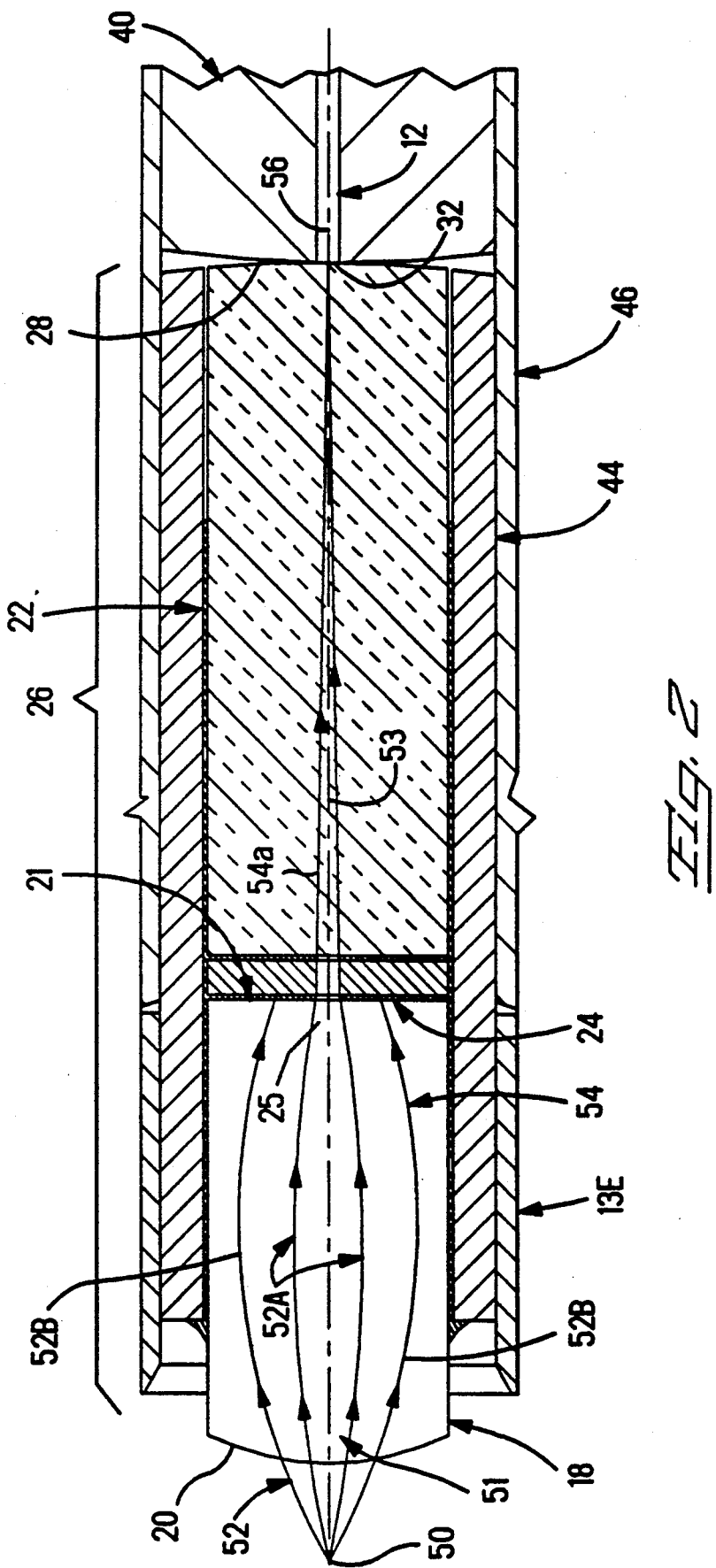
FIG. 2 is an enlarged cross-sectional view illustrating a connector subassembly of the connector assembly of FIG. 1.
Figure 3:
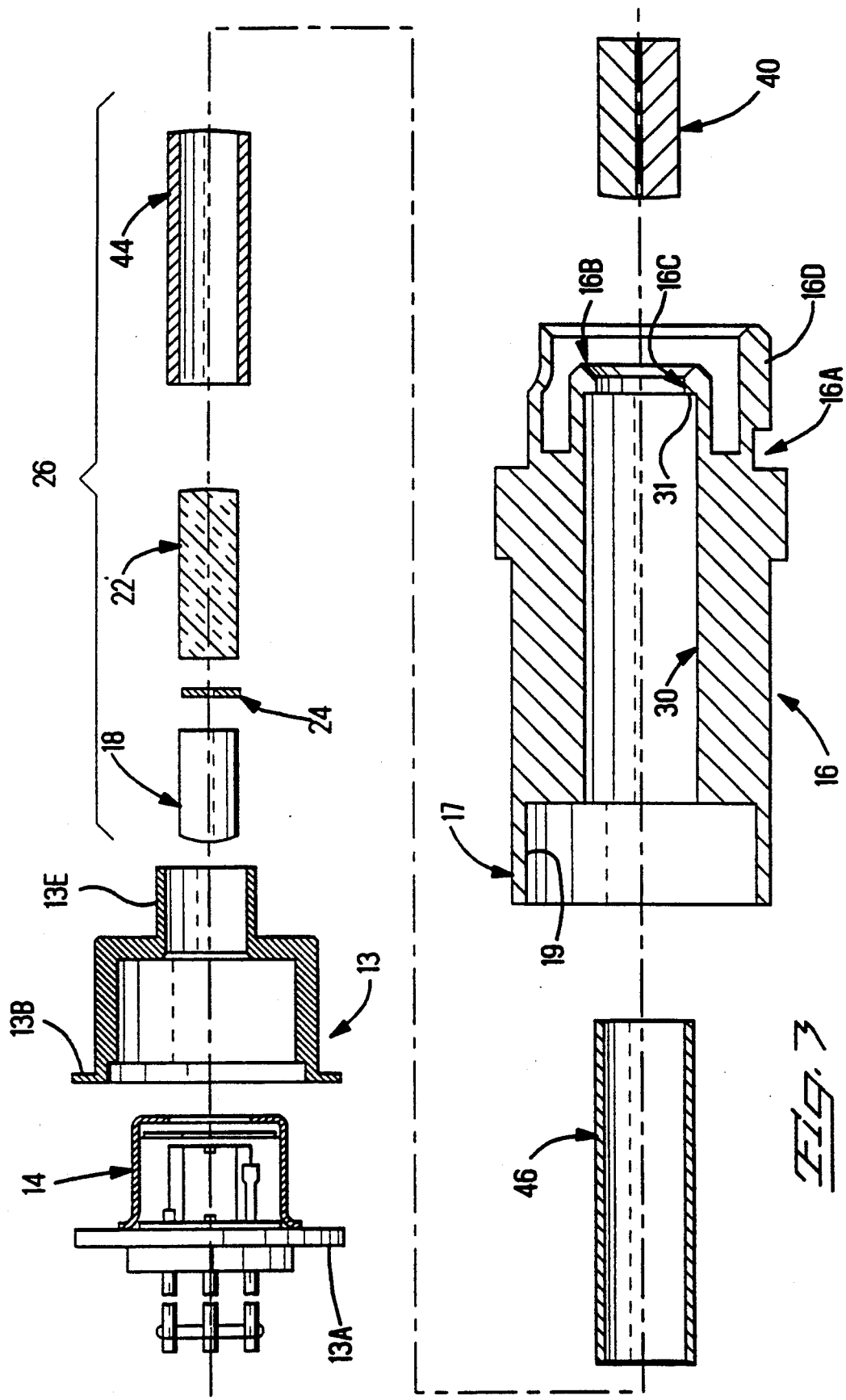
FIG. 3 is an exploded cross-sectional view of the connector assembly of FIG. 1.

Referring to FIGS. 1-3, connector assembly 10 includes a connector body 16, the hermetically packaged laser diode 14 and an optical connecting means 26 which includes an optical focusing element 18 having a receiving end 20 facing the laser diode 14 for converting a diverging optical beam 52 emitted by the laser diode into a converging beam 54 of optical energy an optical coupling element 22 for receiving the converging beam 54 and transmitting the beam to the optical fiber 12, and an optical attenuator 24 interposed between the optical focusing element 18 and the coupling element 22 for attenuating the radiation beam presented to the optical fiber 12.

The optical focusing element 18 and coupling element 22 are transparent, and are thereby able to transmit the optical energy emitted from laser diode 14 to the optical fiber 12. A front end 28 of the coupling element 22 is located at a precise depth in an interior socket 30 of the connector body 16 for physical contact with an end 32 of optical fiber 12 disconnectably inserted into the socket 30. The coupling element 22 and the focusing element 18 are in physical and optical contact with optical attenuator element 24 to eliminate and backward reflection of the optical energy at the interfaces therebetween. The coupling element 22 is in turn in physical contact with the optical fiber 12 to eliminate backward reflection of the radiation beam at that interface. The connector body 16 includes a rear portion 17 with an axial enlarged bore 19.

The hermetically packaged laser diode 14 comprises cylindrical package 15, commonly called a "can," enclosing a known semiconductor 34 with a laser architecture, and a known semiconductor 35 with an optical detector architecture. The base of the package 15 is flange 13A, which can be used for mounting. Electrical leads 14A project rearwardly from the can 15 for connection to a printed circuit board (not shown). An emission edge 36 or emission facet of the semiconductor 34 faces a window 38, coated with an anti-reflective coating on each of its sides, of the can 15 at an emission end 14A of laser diode 14.

As shown in FIG. 1, laser diode 14 is preferably housed in a optical bench 13 that is received in the enlarged rear bore 19 of body 16 and extends partially into socket 30 of the connector body 16. Optical bench 13 preferably includes a rear flange 13B for attachment to the laser diode 14, a cylindrical wall 13C extending forwardly from the rear flange 13B, a front wall portion 13D extending radially inwardly from the cylindrical wall 13C, and a sleeve portion 13E extending forwardly from front wall portion 13D and partially into the socket 30 of connector body 16.

The function of the focusing element 18 and the coupling element 22 of the optical connecting means 26 is to change the large numerical aperture diverging beam 52 emitted by the laser diode into a smaller numerical aperture converging beam 54a that is readily matched to the beam acceptance conditions of the end 32 of optical fiber 12.

To provide for accurate alignment of the components of the connector assembly 10, the assembly further includes a first alignment sleeve 44 encircling and having an inner diameter slightly larger than the outer diameters of the focusing element 18, the attenuator disk 24 and the coupling element 22, a ferrule 40 having an axial passage formed therethrough for receiving the end 32 of optical fiber 12 and having an outer diameter substantially equivalent to the outer diameter of the first alignment sleeve 44, and a second alignment sleeve 46 having an outer diameter slightly smaller than the diameter of the interior socket 30 of connector body 16. Preferably the second alignment sleeve is a split sleeve having an inner diameter slightly smaller than the outer diameters of the first alignment sleeve 44 and the ferrule 40. The split sleeve, as known in the industry acts as a spring to hold the elements in alignment. Alternatively, the sleeve may be a continuous member having an inner diameter slightly larger than the outer diameters of the first alignment sleeve 44 and ferrule 40. The first alignment sleeve 44, focusing element 18, attenuator disk 24 and coupling element 22 collectively define an optical connector subassembly 26 (FIG. 2).

Referring now particularly to FIG. 2, laser diode 14 emits optical energy from a point of origin 50 in a conical diverging beam 52 of large numerical aperture. The focusing element 18 is preferably a gradient refractive index lens, commonly referred to as a "GRIN" lens, that is adapted to receive a beam of optical radiation, such as beam 52, and transform and converge the beam toward a focal point 53 located at a focal length of the focusing element 18 if the beam were to exit into air. A commercial source for the GRIN lens is Nippon Sheet Glass America, Inc., Somerville, N.J. The receiving end 20 of the focusing element 18 is preferably convex and has an exterior anti-reflective coating. The convex, receiving end 20 collects the diverging beam 52 of optical radiation and transforms collected beam into converging beam 54. The coupling element 22 has an index of optical refraction greater than that of air, and refracts the converging into a more gradually converging beam 54a of higher magnification than if the beam were allowed to merely exit into air. The length of the coupling element 22 is selected so that the spot size (the diameter of converging beam 54a) gradually reduces along the length of coupling element 22 until it attains a size substantially equal to the diameter of the mode field of the optical fiber 12 at its end face 32.

Thus, by addition of the coupling element 22, the converging beam 54a is focused to a focal point 56 beyond emitting front end 28 of the coupling element 22. Thus, the focused beam 54a converges at a point 56 well beyond the in-air focal point 53. The beam 54a is also magnified, meaning, that it has a cross section of magnified size as compared with the size of the source emission at the front facet of the semiconductor 34 and it has a lower numerical aperture than that of the diverging beam 52 and also lower numerical aperture than would have been achieved in air at focal point 53.

The coupling element 22 is disposed in physical and optical contact with optical attenuator 24 without an air gap therebetween, attenuator 24 is in physical and optical contact with the emitting front end 21 of focusing element 18 without an air gap therebetween by means of a transparent adhesive, thereby eliminating backward reflection of the converging beam 54 as it is absorbed by coupling element 22. Preferably, the adhesive is selected to have an index of refraction that closely matches those of the fused silica and glass, the silica and glass preferably having been selected to have approximately the same refractive index. The coupling element 22 is a high purity silica rod commercially available from Polymicro Technologies, Phoenix, Ariz. The coupling element 22 receives the converging beam 54a and transmits it into the core of optical fiber 12 at end 32 held in concentric ferrule 40 or plug of a complementary connector assembly 42.

With particular reference to FIG. 2, a certain portion 52A of beam 54 is of a generally lower order and is emitted at low angles with respect to an axis 51 of emission of laser diode 14. Another portion 52B of the beam is of a generally higher order and is emitted at high angles with respect to emission axis 51. Attenuator 24 comprises a disk-shaped member having a small central opening or aperture 25 (see FIG. 4) provided to allow only beam portion 52A of a lower order to pass through the aperture 25 while blocking beam portions 52B of higher order. This results in the transmission of a radiation beam 54a of generally reduced power to the output end of coupling element 22 and to the optical fiber 12. Converging beam 54a remains of sufficient intensity to perform its intended functions when coupled to optical fiber 12.

The diameter of aperture 25 determines the amount of diverging beam 52 emitted by the laser diode that will be allowed to pass through attenuator disk 24 to optical fiber 12. The smaller the diameter of aperture 25, the more diffracted the passing converging beam will be. Diffraction broadens the beam lowering the power density, and thereby lowering the power coupled into optical fiber 12.

Assembly of the connector assembly 10, best shown in FIG. 3, is accomplished by first assembling the focusing element 18, the attenuator disk 24 and the coupling element 22 with a heat/light cured transparent adhesive in physical air-tight contact with one another within the first alignment sleeve 44, thereby defining optical connector subassembly 26 (FIG. 2), with the receiving end 20 of the focusing element 18 extending beyond the rear end of sleeve 44. The coupling element 22 is in physical and optical contact with the disk 24, which in turn is in physical and optical contact with the emitting end 38 of focusing element 18. Such physical and optical contact is established by the film of light-curing transparent adhesive joining the coupling element 22, the disk 24 and the focusing element 18 without an air gap. The flange 13B of the optical bench 13 is held against a positioning surface defined by base flange 13A of the laser diode 14. A connector subassembly 26 is adjusted to establish precise distance from the receiving end 20 of focusing element 18 to the emission area 36 of semiconductor 34. The laser diode can 15 has a loose fit within the enlarged bore 19 of the rear portion of the optical bench 13. The lateral position of the laser diode 14 is adjusted within the bore 13F, while the laser diode 14 is operating, until the laser emission is detected to be symmetrical about the axis of the optical fiber 12. The laser diode 14 then may be secured by laser welding the intersection of the sleeve portion 13F of the optical bench 13 to the sleeve 44 of the optical connector subassembly 26, as well as the flange 13B to the optical bench and the positioning base flange 13A of the laser diode 14. The optical bench 13 is then secured in position within the rear axial base 19 of rear portion 17 of connector body 16 by structural adhesive 19A.

Optical connector subassembly 26 is slidably received at its forward end within second alignment sleeve 46, which in turn is received within the socket 30 near the front portion 16A of connector body 16. Second alignment sleeve 46 is restricted in its forward movement by an internal, rear-facing shoulder 31 within socket 30. In the preferred embodiment second alignment sleeve 46 is a split sleeve.

The front portion 16A of body 16 has a forward flange 16B provided with an opening 16C therein for receiving the complementary connector assembly 42. The diode connector assembly 10 may be connected to the complementary fiber optic connector assembly 42 (FIG. 1) by means known in the art, such as for example, bayonet coupling, threaded coupling or the like.

The laser diode casing 13 is axially advanced into position in bore 19 and socket 30 until the front, fitting end 28 of coupling element 22 is precisely located within the connector body 16 at a reference plane 10' to establish physical contact with the end 32 of the optical fiber 12 at the reference plane 10' without exerting excessive pressure on end 32.

The front face or end 32 of optical fiber 12 would be a detrimental source of reflection of low angle, laser emission back to the laser diode 14 if coupling in air. Physical contact between the front end 28 of coupling element 22 and the end 32 of the optical fiber 12 eliminates such reflection, and provides a coupling with the same accuracy of alignment as a coupling of an optical fiber to another optical fiber. In the preferred embodiment, the first alignment sleeve 44 and the ferrule 40 have the same outer diameter (approximately 2.5 mm), which is slightly larger than the inner diameter of second or split alignment sleeve 46, such that ferrule 40 and sleeve 44 help maintain the emission axis 51 of diode 14 in axial alignment with the optical fiber 12.

Figure 4:
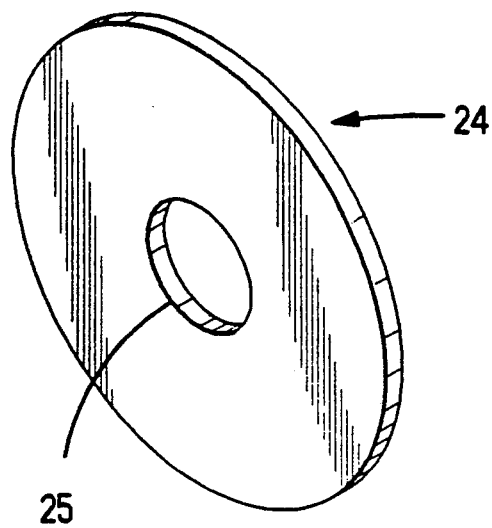
FIG. 4 is an enlarged perspective view of the aperture disk attenuator illustrated in FIGS. 1-3.

Shown in FIG. 4 is an enlarged isolated view of the attenuator disk 24 which comprises a thin, flat disk-shaped member having central aperture 25 formed therein. The disk is preferably coated with a black highly absorbing coating on each side thereof to reduce reflection therefrom. Preferably, aperture 25 is about 0.0038 inches to about 0.0397 inches in diameter depending on the degree of attenuation desired. Disk 24 preferably has a thickness of less than 0.002 inches and outer diameter of approximately 0.0702 to 0.0712 inches.

Figure 5:
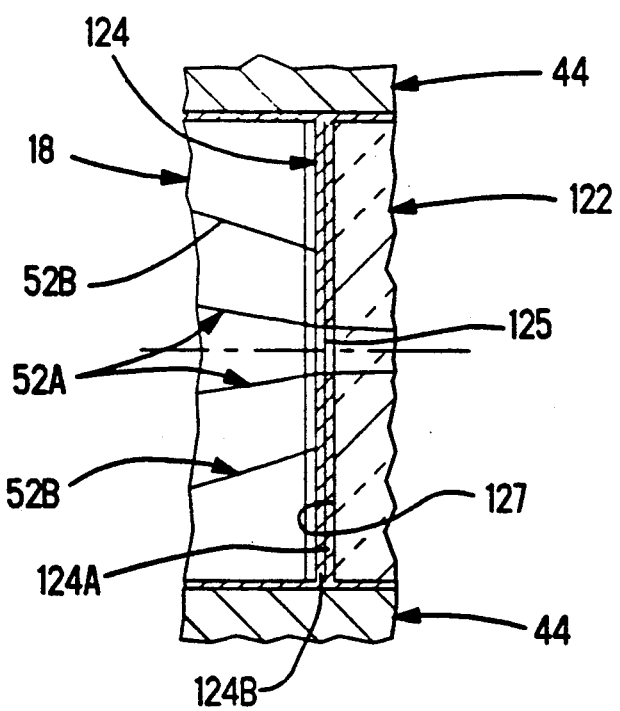
FIG. 5 is an enlarged fragmentary view of an alternative embodiment of the attenuator.

FIG. 5 shows an enlarged fragmentary alternative embodiment 110 of the present invention in which the trailing end 127 of coupling element 122 has a metalized layer forming a blackened surface having an aperture 125 extending therethrough. The blackened surface functions in the same manner as disk 24 to allow beam portion 52A to pass through the aperture while blocking the remaining beam portion 52B. The metalized layer is preferably formed from a layer 124A of titanium and a layer 124B of nickel. The nickel layer is then blackened by means known in the art, such as for example, EBONOL Z-80, available from Enthone-OMI, Inc., New Haven, Conn.

Although the foregoing provides a presently preferred embodiment of the invention, those skilled in the art will understand that numerous modifications and variations may be made without departing from the scope of this invention. For example, the focusing element 18 and the optical coupling element 22 can be replaced by other optical connecting structures for transmitting the light from the laser diode to the optical fiber, and the attenuation means may be positioned at any appropriate location in the connecting structure. Also, the attenuation means may take forms other than the disk 24 employed in the preferred embodiment.

Because numerous modifications and variations can be made, it should be understood that the present invention is intended to cover any such modifications and variations that are included within the scope of the following claims.

We claim:

1. A connector assembly for connecting an optical energy source to an optical fiber, comprising:
   a focusing element having an input for receiving a diverging beam of optical energy from the source, the focusing element converting the diverging beam into a converging beam of optical energy;
   a coupling element for receiving the converging beam of optical energy from the focusing element and transmitting the converting beam to an output thereof in a form to be received by the optical fiber; and
   an attenuator between the focusing element and the coupling element for symmetrically attenuating the converging beam allowing only a central portion of the beam, which corresponding to lower orders, to pass.

2. The connector assembly of claim 1, wherein the attenuator is a disk-shaped element with opposed surfaces having an aperture therethrough.

3. The connector assembly of claim 1, further including an adhesive for bonding the focusing element, the attenuator and the coupling element to one another establishing physical and optical contact at the interfaces.

4. The apparatus of claim 1 wherein said optical energy source comprises a laser diode.

5. The connector assembly of claim 4 wherein opposed surfaces of said disk-shaped element have a highly absorptive coating to prevent reflections therefrom.

6. The connector assembly of claim 1, wherein said small aperture is sized to allow lower orders of said converging energy beam to pass therethrough while blocking higher orders of said converging beam.

7. The connector assembly of claim 2 and further including an adhesive for bonding said focusing element said disk-shaped element and said coupling element to one another in physical and optical contact at interfaces therebetween.

8. The connector assembly of claim 1, further including an alignment for supporting the focusing element, the attenuator and the coupling element to define a connector subassembly of said connector assembly.

9. The connector assembly of claim 1, wherein the attenuator comprises at least one highly absorptive metalized layer, disposed on a leading end of the coupling element, the layer having a central opening for passing lower orders of said beam of collected optical energy therethrough and for blocking higher orders of said beam of collected optical energy.

10. The connector assembly of claim 9, wherein said at least one metalized layer is comprised of a first coating of titanium and a second coating of nickel.

* * * * *

UNITED STATES PATENT AND TRADEMARK OFFICE
CERTIFICATE OF CORRECTION

PATENT NO. : 5,243,681
DATED      : September 7, 1993
INVENTOR(S) : Terry P. Bowen, et al.

It is certified that error appears in the above-identified patent and that said Letters Patent is hereby corrected as shown below:

Col. 7, line 28, "corresponding" should read --corresponds--

Signed and Sealed this

Twelfth Day of April, 1994

Attest:

BRUCE LEHMAN

*Attesting Officer*    *Commissioner of Patents and Trademarks*